UNITED STATES PATENT OFFICE 2,390,106

PROCESS FOR PREPARING CARBOXYLIC ANHYDRIDES

Vernon K. Krieble, Hartford, Conn., and Robert H. Smellie, Oak Ridge, Tenn.

No Drawing. Application July 31, 1944, Serial No. 547,508

9 Claims. (Cl. 260—546)

This invention relates to a process for preparing carboxylic anhydrides.

It is known that methyl cyanide (acetonitrile) can be converted to acetamide by treating the methyl cyanide with concentrated sulfuric acid in glacial acetic acid. When hydrogen cyanide is treated with hydrogen chloride in substantially anhyrous acetic acid, a mixed carboxylic anhydride of formic and acetic acids appears to be formed.

We have now found, however, that when a monocarboxylic acid, which is substantially anhydrous and has a dissociation constant greater than that of formic acid, is reacted with hydrogen cyanide and a hydrogen halide other than hydrogen iodide, a symmetrical carboxylic anhydride and formamide are produced.

It is, accordingly, an object of our invention to provide a process for preparing carboxylic anhydrides. Other objects will become apparent hereinafter.

In accordance with our invention, we react a substantially anhydrous monocarboxylic acid having a dissociation constant greater than that of formic acid with hydrogen cyanide and a hydrogen halide other than hydrogen iodide. As carboxylic acids having dissociation constants greater than that of formic acid, chloracetic acid, dichloracetic acid, bromacetic acid, $\alpha$-chloropropionic acid, $\alpha$-bromopropionic acid and nitroacetic acid are exemplary. Hydrogen fluoride, hydrogen chloride or hydrogen bromide can be employed as the hydrogen halide. However, hydrogen chloride is advantageously employed in practicing our invention.

While the exact chemical mechanism of our new process is not essential to the understanding of the process, it appears that the process follows the course given in the following chemical equations:

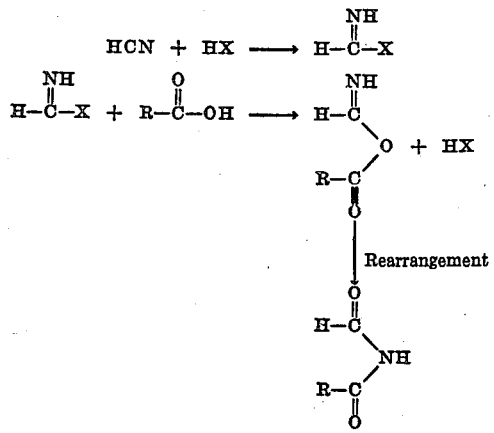

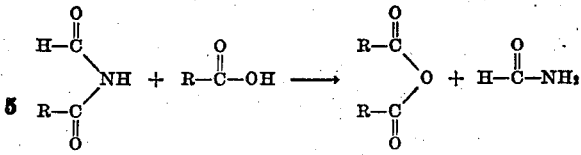

(R represents the residue of a carboxylic acid having a dissociation constant greater than that of formic acid, X represents F, Cl or Br.)

It will be seen from these chemical equations that the end products obtained in our process is a symmetrical carboxylic anhydride and formamide. Since the hydrogen halide is regenerated in the process, the hydrogen halide need not be employed in an amount molecularly equivalent to the hydrogen cyanide.

Where the monocarboxylic acid employed as starting material is a liquid at ordinary temperatures, the carboxylic acid can be reacted with the hydrogen halide and hydrogen cyanide without difficulty in the absence of a diluent. However, where the carboxylic acid is a solid at ordinary temperatures, it is more advantageous to dissolve the carboxylic acid in a solvent which is advantageously an organic liquid having dielectric constant no greater than ten. Typical of such solvents are the aliphatic ethers, e. g. diethyl ether, diisopropyl ether and methyl n-butyl ether, or hydrocarbons such as hexane, heptane, benzene or toluene. 1,4-dioxane can also be used as the solvent. Even where the carboxylic acids are liquid at ordinary temperatures, the process can be carried out in a solvent.

The manner of obtaining carboxylic anhydrides in accordance with our invention is further illustrated in the following examples:

*Example 1.—Anhydride of monochloracetic acid*

290 g. (3 moles) of monochloracetic acid and 21.6 g. (8 moles) of hydrogen cyanide were mixed with 100 cc. of dry redistilled 1,4-dioxane which had been previously saturated with dry hydrogen chloride. The mixture was allowed to stand for about 12 hours at 20° to 25° C. It was then subjected to vacuum distillation through a fractionating column. After the dioxane distilled over, the temperature rose to 97° to 98° C. at 15 mm. of mercury. At this temperature 185 g. of monochloracetic acid distilled over. The temperature then rose to 107° C. and between this temperature and 112° C., 65 g. of material distilled. This latter product melted sharply at 46° C. and boiled at atmospheric pressure at 203° C. with some decomposition. This product which melted at 46° C. was the pure anhydride of monochloracetic acid.

*Example 2.—Anhydride of dichloracetic acid*

130 cc. (¾ mole) of dichloracetic acid saturated with hydrogen chloride were mixed with 30 cc. of anhydrous hydrogen cyanide (¾ mole) at 0° C. After 24 hours, only 33 per cent of the hydrogen cyanide had disappeared. To the mixture were then added 55 cc. of 1,4-dioxane which had been previously saturated with hydrogen chloride. After another 24 hours, only a trace of hydrogen cyanide remained. The mixture was then fractionally distilled under reduced pressure. After the removal of hydrogen chloride and dioxane, 105 g. of dichloracetic acid were recovered. Following this, 22 g. of formamide distilled and finally at 20 mm. of mercury pressure, 66 g. of the anhydride of dichloracetic acid distilled over between 120° and 130° C.

In a manner similar to that illustrated in the foregoing examples, other anhydrides of monocarboxylic acids having a dissociation constant greater than that of formic acid can be obtained.

What we claim as our invention and desire to be secured by Letters Patent of the United States is:

1. A process for preparing a carboxylic anhydride comprising reacting, under substantially anhydrous conditions, a monocarboxylic acid having a dissociation constant greater than that of formic acid with hydrogen cyanide and a hydrogen halide other than hydrogen iodide.

2. A process for preparing a carboxylic anhydride comprising reacting, under substantially anhydrous conditions, a monocarboxylic acid having a dissociation constant greater than that of formic acid with hydrogen cyanide and hydrogen chloride.

3. A process for preparing a carboxylic anhydride comprising reacting, under substantially anhydrous conditions, a monocarboxylic acid having a dissociation constant greater than that of formic acid with hydrogen cyanide and a hydrogen halide other than hydrogen iodide, in a liquid solvent for the monocarboxylic acid, the solvent having a dielectric constant not greater than ten.

4. A process for preparing a carboxylic anhydride comprising reacting, under substantially anhydrous conditions, a monocarboxylic acid having a dissociation constant greater than that of formic acid with hydrogen cyanide and hydrogen chloride, in an organic solvent for the monocarboxylic acid, the solvent having a dielectric constant not greater than ten.

5. A process for preparing a carboxylic anhydride comprising reacting, under substantially anhydrous conditions, a monocarboxylic acid having a dissociation constant greater than that of formic acid with hydrogen cyanide and hydrogen chloride, in an ether solvent for the carboxylic acid, the solvent having a dielectric constant not greater than ten.

6. A process for preparing a carboxylic anhydride comprising reacting, under substantially anhydrous conditions, a monocarboxylic acid having a dissociation constant greater than that of formic acid with hydrogen cyanide and hydrogen chloride, in a hydrocarbon solvent for the carboxylic acid, the solvent having a dielectric constant not greater than ten.

7. A process for preparing a carboxylic anhydride comprising reacting, under substantially anhydrous conditions, a monocarboxylic acid having a dissociation constant greater than that of formic acid with hydrogen cyanide and hydrogen chloride, in 1,4-dioxane.

8. A process for preparing the anhydride of monochloracetic acid comprising reacting, under substantially anhydrous conditions, monochloracetic acid with hydrogen cyanide and hydrogen chloride, in 1,4-dioxane.

9. A process for preparing the anhydride of dichloracetic acid comprising reacting, under substantially anhydrous conditions, dichloracetic acid with hydrogen cyanide and hydrogen chloride, in 1,4-dioxane.

VERNON K. KRIEBLE.
ROBERT H. SMELLIE.